United States Patent [19]

Early

[11] 3,896,485

[45] July 22, 1975

[54] CHARGE-COUPLED DEVICE WITH OVERFLOW PROTECTION

[75] Inventor: James M. Early, Palo Alto, Calif.

[73] Assignee: Fairchild Camera and Instrument Corporation, Mountain View, Calif.

[22] Filed: Dec. 3, 1973

[21] Appl. No.: 421,314

[52] U.S. Cl. .................. 357/24; 178/7.1; 250/211 J; 307/311; 357/30

[51] Int. Cl.² .......................................... H01L 27/14

[58] Field of Search ................. 357/24, 30; 178/7.1; 250/211 J, 578; 307/304, 221 D, 311

[56] References Cited

UNITED STATES PATENTS

| | | | |
|---|---|---|---|
| 3,715,485 | 2/1973 | Weimer | 357/24 |
| 3,728,590 | 4/1973 | Kim et al. | 317/235 G |
| 3,771,149 | 11/1973 | Collins et al. | 317/235 G |
| 3,792,322 | 2/1974 | Boyle et al. | 317/235 G |
| 3,852,799 | 12/1974 | Walden | 357/24 |
| 3,863,065 | 1/1975 | Kosonocky et al. | 357/24 |
| 3,866,067 | 2/1975 | Amelio | 357/24 |

OTHER PUBLICATIONS

Sequin, "Blooming Suppression in CCAIDs," Bell System Tech. Journal, Oct. 1972, pp. 1923–1926.

Amelio, "Physics and Applications of CCDs," IEEE International Convention, 1973, paper no. 1/3 (pub. in Tech. Papers Vol. 6, Mar. 26, 1973).

*Primary Examiner*—William D. Larkins

*Attorney, Agent, or Firm*—J. Ronald Richbourg; Alan H. MacPherson

[57] ABSTRACT

Charge sink regions are buried within the semiconductor material of a charge-coupled imaging device for sinking excess charges accumulated within the device. By locating the charge sink regions a given depth within the substrate, a limited amount of charge can be allowed to accumulate in the light sensing elements while any additional charge will transfer to the charge sink region. Also, by varying a potential applied to the charge sink region charge accumulation within the light sensing elements can be controlled.

8 Claims, 2 Drawing Figures

CHARGE-COUPLED DEVICE WITH OVERFLOW PROTECTION

BACKGROUND OF THE INVENTION

This invention relates to charge coupled devices and in particular to imaging devices where charge saturation is prevented by allowing excess charge to be removed before saturation occurs, and the method of operating such structures.

DESCRIPTION OF THE PRIOR ART

W. S. Boyle and G. E. Smith describe the basic concept of charge coupled semiconductor devices (hereinafter referred to as "CCD") in an article published in the April, 1970 Bell System Technical JOURNAL, page 587, entitled "Charge Coupled Semiconductor Devices." As discussed by Boyle and Smith, CCD's are potentially useful as shift registers, delay lines, and in two dimensions as imaging or display devices. As disclosed in copending patent application Ser. No. 362,131 filed on May 21, 1973 by Gilbert F. Amelio for "Charge-Coupled Device with Exposure and Anti-Blooming Control," now U.S. Pat. No. 3,866,067 and assigned to the assignee of this invention, charge packets accumulate in the substrate of a CCD imaging array (either linear or area) in response to light incident on the substrate, and are stored in potential wells near the surface of the array. The semiconductor material in which one packet of charge is accumulated in response to incident light, together with the overlying insulation and conductor, is called a "photo sensor" or alternatively a "light sensing element." The accumulated packet of charge comprises carriers which are minority in relation to the conductivity type of the predominant impurity in the substrate containing the potential wells. The potential wells are localized beneath an optically transparent conductor and each well is bounded on two of its four sides by so-called channel stop diffusions, on the other two sides parallel to the surface by a gated CCD analog shift register and by a third channel stop diffusion, on its top by insulation and on its bottom by semiconductor material. The walls of a light sensing element may also be limited by either oxide or the edges of buried channels (i.e., an end or an edge of a buried channel would inhibit charge flow within the substrate).

When this three-dimensional well becomes saturated with charge, charge carriers spread away from the desired assembly point in the light-sensing element and "blooming" occurs. "Blooming" is defined as the spreading of the charge originally accumulated in a light sensing element in such a way that this charge appears to have originated in other successive adjacent light sensing elements.

As disclosed in the above-cited application Ser. No. 362,131, a charge sink region associated with each light sensing element in the array is disposed within the CCD substrate to prevent "blooming" from seriously degrading the detected image. This anti-blooming structure disclosed by Amelio requires a large amount of space on the surface of CCD imaging arrays because one charge sink region is required for each light sensing element. This structure reduces the resolution of the image detected by the array since the anti-blooming structures disposed on the surface of the array cannot produce output signals indicative of incident light.

In patent application Ser. No. 395,663 filed on Sept. 10, 1973 by Gilbert F. Amelio and Rudolph H. Dyck for "Charge Coupled Area Imaging Device with Column Anti-Blooming Control," and assigned to the assignee of this invention, a CCD area array uses only a single sink region per column of light sensing elements. This structure employs a diode disposed in cooperating relationship with each of the shift registers for sinking excess charges, and thereby prevents the excess charges from spreading into the output register or other areas of the device where excess charges are undesirable. By using only one sink region per column, the number of sink regions is reduced relative to the number of such regions in the abovedescribed Amelio structure resulting in a smaller array size and higher resolution of the image. However, saturation of the light sensing elements within a given column is not prevented by the structure of Amelio et al. application Ser. No. 395,663.

SUMMARY OF THE INVENTION

In accordance with this invention, charge sink regions are buried within the semiconductor substrate in proximity to light sensing elements of the CCD structure, for sinking excess accumulated charges. These charge sink regions do not require any space on the surface area of the array; and can prevent saturation of charge within a CCD array such as that disclosed in a patent application by Lloyd R. Walsh for "Charge-Coupled Area Array," Ser. No. 391,119, filed on Aug. 27, 1973, and assigned to the assignee of this invention.

In accordance with an embodiment of this invention, charge sink regions are formed on the surface of a first substrate constructed from semiconductor material, and an epitaxial layer of semiconductor material constituting a second substrate is formed over the first substrate. The thickness of the second substrate determines the distance of the charge sink regions from the surface of the second substrate. The light sensing elements of the CCD array are formed on the surface of the second substrate, and electrical connecting structures are formed to penetrate through the second substrate for making ohmic contact with the charge sink regions formed in the first substrate.

This structure prevents blooming from affecting light sensing elements in a charge-coupled imaging array, and enables construction of a high resolution charge coupled imaging device with a charge sink region associated with each light sensing element.

DETAILED DESCRIPTION

Figure 1:
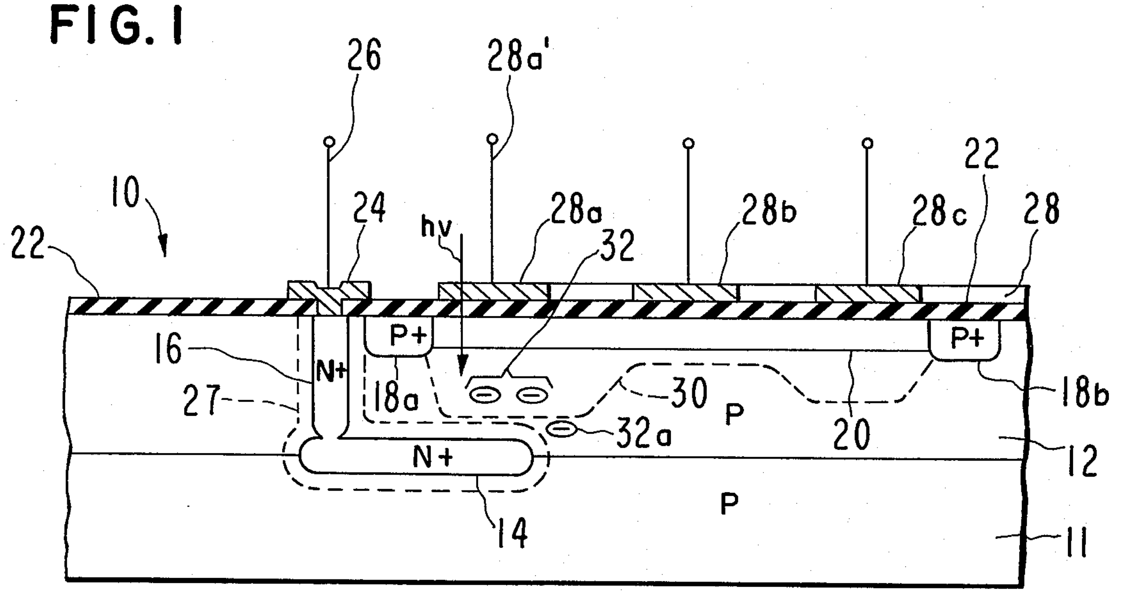
FIG. 1 shows a cross section of a single light sensing element with a buried charge sink region disposed in the vicinity thereof for sinking excess charge.

With reference to FIG. 1, a portion of a charge coupled device 10 is shown in cross section. While one embodiment will be described as using silicon semiconductor material, this invention can be implemented with any semiconductor material in which a charge coupled device can be formed.

One embodiment of the device 10 is formed from a combination of two semiconductor substrates 11 and 12, which are typically silicon. The starting material for the process of fabricating the device 10 is the substrate 11, which is of a P type material for explanation of this invention. However, opposite type conductivity material may be used and the conductivity types in the subsequent description would be reversed. Substrate 11 is masked and charge sink regions, such as regions 14, are formed by implanting or diffusing into the substrate 11 an N type impurity such as phosphorous to form high conductivity N+ type regions. Regions 14 (of which only one is shown in cross-section) are of a conductivity type opposite to that of substrate 11. Next, the insulation masking (not shown) is removed and an epitaxial layer 12 (formed from the same P type conductivity material as that of the substrate 11) is deposited on the bare silicon surface of P type substrate 11 containing N+ regions 14. The N type impurity forming region 14 will diffuse into layer 12 during and following the deposit of layer 12 over substrate 11. Therefore, region 14 is located near the surface between substrate 11 and layer 12, and not necessarily located solely within substrate 11; that is, region 14 is buried within the semiconductor material.

In accordance with one embodiment, N+ type material, such as phosphorous, is implanted or diffused into layer 12 for forming region 16 which makes ohmic contact with region 14. Other electrical connecting means may be employed for making ohmic contact with region 14. This structure provides a means for externally applying an electrical potential to region 14 as will be explained further hereafter.

Channel stop regions, such as regions 18*a* and 18*b*, are formed within the top surface of layer 12. Layer 12 is described and shown as having P type conductivity, and thus the channel stop regions are likewise formed from a P type conductivity material, but with a higher concentration of P type impurities than in layer 12. Therefore, the channel stop regions are designated herein by the symbol "P+."

To improve the performance of the device of the present invention, a buried channel may be employed. A buried channel is obtained typically by placing appropriate impurities (n type impurities for an n channel device and p type impurities for a p channel device) in the semiconductor directly adjacent the semiconductor-insulator interface. Typically, this layer is formed by using ion implantation techniques. In FIG. 1, such an n type layer forms buried channel region 20.

An insulator material 22, such as silicon dioxide when a silicon substrate is employed, is formed over the top surface of layer 12. A portion of the insulation material 22 is removed from the area over region 16 in order that an external electrical contact may be made with regions 14 and 16. A metallic conducting material 24 is formed in ohmic contact with the region 16. An electrical lead 26 is connected to the region 24 for applying a potential to the buried charge sink region 14, by means of region 16. A depletion region is formed within substrates 11 and 12 in response to a potential applied on lead 26, which depletion region is illustrated in FIG. 1 by dashed line 27.

Conductors 28*a*, 28*b*, and 28*c*, which function as photogate conductors for controlling the CCD channel potential of the light sensing elements, typically comprise a portion of a layer 28 of transparent material such as selectively-doped polycrystalline silicon. The method of forming a plurality of transparent conductors, such as conductors 28*a*, 28*b*, and 28*c* from a single layer of doped polycrystalline silicon is disclosed in U.S. Pat. No. 3,728,590 issued to Chung-Ki Kim and Edward H. Snow on Apr. 17, 1973 and assigned to the assignee of this invention. The structure and operation of a typical photogate, similar to conductors 28*a*, is disclosed in patent application Ser. No. 357,760 filed May 7, 1973 by Gilbert F. Amelio, for "Transfer Gate-Less Photosensor Configuration," and assigned to the assignee of this invention.

A potential is applied to conductor 28*a* lead 28*a'* to form a depletion region in the underlying substrate 12 as illustrated by dashed line 30. Incident light passes through conductor 28*a*, as shown by arrow hv (where hv represents a flux of photons) directed into the substrate in and near where electrons 32 accumulate in response to the incident light. The electrons 32 accumulate in the depletion region in an amount proportional to the integral of the light incident on the particular region underlying conductor 28*a*. Electrons 32 thus represent the intensity of the incident light, and together constitute one of the charge packets referred to herein. The electrons 32 will remain in the potential well as defined by dashed line 30. However, when excess electrons such as electron 32*a* are accumulated within the well, these electrons will transfer to the charge sink region 14. The potential applied to the buried charge sink region 14 is varied by varying the potential applied on lead 26.

Exposure time of the array constructed in accordance with this invention may be controlled electronically. That is, the voltage applied on lead 26 may be varied to change the level at which charge accumulation is limited beneath the electrode 28*a*. By simultaneously raising the potential on lead 26 and lowering the potential on electrodes 28*a* and 28*b*, the charge accumulated beneath electrode 28*a* is removed through charge sink region 14, region 16 and lead 26. During a given interval of time, all accumulated charge may be removed from the CCD structure. When the potentials applied on the electrodes and on lead 26 are returned to the level for normal operation, electrons 32 accumulate for a desired interval of time as described above. The electrons thus accumulated may be transferred to an output register as disclosed in the above-identified patent application Ser. No. 391,119.

Figure 2:
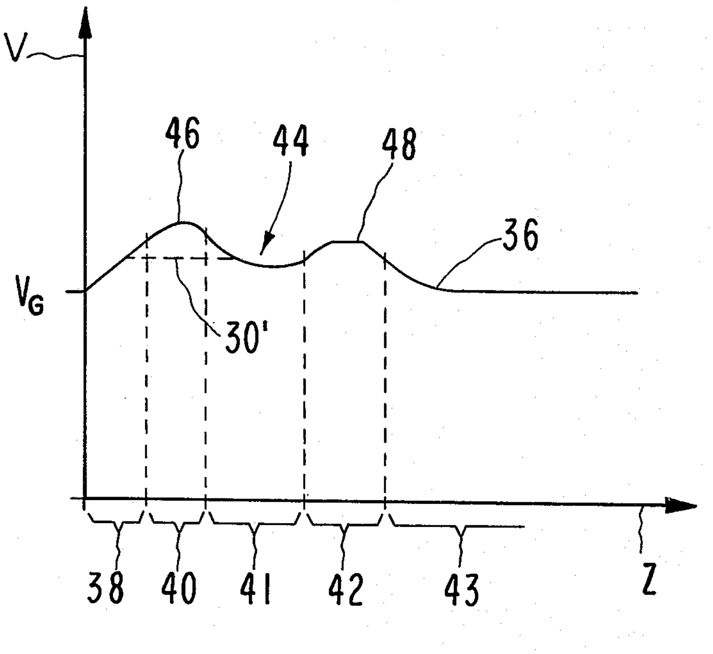
FIG. 2 is a diagram showing the potential as a function of depth within the semiconductor material of a CCD structure.

The relationship between the voltages within the substrate 11 and epitaxial layer 12 and the depth of the charge sink region 14 during the time charge is being accumulated in the potential well beneath gate 28*a* is illustrated in FIG. 2 by curve 36. Curve 36 represents voltage. Electron potential energy is minimized when voltage is maximized. The abscissa in the diagram shown in FIG. 2 represents depth within the substrate 12 and is designated herein by the symbol "Z." The voltage is represented by the ordinate axis and is designated herein by the symbol "V." At zero depth, or at the surface of the substrate 12, a voltage is applied to conductor 28*a* and is designated herein by the symbol "$V_G$." A first division along the abscissa, depicted by bracket 41, represents a portion of the layer 12; a fourth division along the abscissa, depicted by bracket 42, represents the N+ region 14; and a fifth division along the abscissa, depicted by the bracket 43, represents a portion of the substrate 11. The voltage within the silicon of the layer 12 initially increases as depth increases. The voltage reaches a maximum at point 46, before reaching the depth at the interface between the buried channel 20 and the silicon substrate material. At further depths, the voltage then drops to that of the silicon substrates 11 and 12, and reaches a low at point 44. However, the presence of region 14 modifies the potential within the substrates 11 and 12 where the voltage increases to a value (point 48) determined by the voltage applied on lead 26. As depth increases, the voltage at point 44, between the two high points 46 and 48, allows electrode 28*a* to function as a photosensing element by permitting electrons to accumulate at the voltage high point 40 (i.e., the point of minimum electron energy). However, when electrons 32 begin to saturate within the potential well, as defined by dashed lines 30 and 30', electrons (such as 32*a* in FIG. 1) will have sufficient energy to cross the barrier defined at point 44 and thereby travel to the N+ region 14. This constitutes the anti-blooming feature as disclosed above, which limits electron accumulation under electrode 28*a*, and prevents overflow to adjacent light sensing elements or to other adjacent charge-coupling electrodes.

I claim:

1. Structure which comprises:

a. a light sensing element comprising a first region of semiconductor material overlaid by a first electrode separated from said semiconductor material by insulation, said light sensing element being capable of containing a charge packet;

b. an adjacent region of said semiconductor material disposed for receiving said charge packet from said light sensing element;

c. means for controlling the transfer of said charge packet from said light sensing element to said adjacent regions; and, d. charge sink means having a contact for applying a bias thereto buried within said semi-conductor material and disposed for receiving excess charge accumulated in said light sensing element, said charge sink means extending laterally from said contact toward said light sensing element while beneath the surface of said semiconductor material.

2. Structure as defined in claim 1 further including means for applying a potential to said charge sink means.

3. Structure as defined in claim 1, wherein said charge sink means comprises a region of conductivity type opposite to that of said semiconductor material.

4. Structure as defined in claim 1, wherein said first electrode comprises polycrystalline silicon.

5. Structure which comprises:

a. a first semiconductor substrate;

b. a second semiconductor substrate located over said first substrate;

c. a light sensing element comprising a first region of said second substrate overlaid by a first electrode separated from said second substrate by insulation, said light sensing element being capable of containing a charge packet;

d. an adjacent region of said second substrate disposed for receiving said charge packet from said light sensing element;

e. means for controlling the transfer of said charge packet from said light sensing element to said adjacent region; and, f. charge sink means located in and extending laterally along the surface of said first substrate so that said charge sink means lies beneath the surface of said second substrate, said charge sink means being disposed for receiving excess charge accumulated within said light sensing element.

6. A structure as defined in claim 5 further characterized by means for applying a potential to said charge sink means.

7. A method of operating a charge-coupled imaging device formed in semiconductor material containing at least one light sensing element and a charge sink region having a contact for applying a first potential thereto located beneath the surface of said semiconductor material and extending laterally from said contact toward said at least one light sensing element, which comprises:

a. accumulating packets of charge in said at least one light sensing element; and, b. allowing excess charges within said at least one light sensing element to transfer to said charge sink region by applying said first potential to said charge sink region during a selected time interval.

8. A method as defined in claim 7 further including the step of preventing the accumulation of said packets of charge within said light sensing element by applying a second potential to said charge sink means during a second time interval.

* * * * *